(12) United States Patent  
Hazen et al.

(10) Patent No.: US 11,667,588 B2  
(45) Date of Patent: Jun. 6, 2023

(54) STABILIZED LIQUID AMMONIA FERTILIZER FROM ANIMAL WASTE

(71) Applicants: John S. Martin, Overland Park, KS (US); William P. Love, Overland Park, KS (US); Perfect Blend, LLC, Bellevue, WA (US)

(72) Inventors: Daniel T. Hazen, Bellevue, WA (US); John S. Martin, Prairie Village, KS (US); Lloyd Patrick Burchard, West Richland, WA (US); William P. Love, Leawood, KS (US)

(73) Assignees: Perfect Blend, LLC, Bellevue, WA (US); HYOF, LP, Overland Park, KS (US)

( * ) Notice: Subject to any disclaimer, the term of this patent is extended or adjusted under 35 U.S.C. 154(b) by 82 days.

(21) Appl. No.: 16/277,039

(22) Filed: Feb. 15, 2019

(65) Prior Publication Data

US 2019/0248711 A1  Aug. 15, 2019

Related U.S. Application Data

(60) Provisional application No. 62/631,403, filed on Feb. 15, 2018.

(51) Int. Cl.  
  *C05F 3/02* (2006.01)  
  *C05C 3/00* (2006.01)

(52) U.S. Cl.  
  CPC .................. *C05F 3/02* (2013.01); *C05C 3/00* (2013.01); *C05C 3/005* (2013.01)

(58) Field of Classification Search  
  CPC ... C05F 3/02; C05C 3/005; C05C 3/00; Y02P 20/145; Y02A 40/20  
  See application file for complete search history.

(56) References Cited

U.S. PATENT DOCUMENTS

| | | | |
|---|---|---|---|
| 4,842,790 A * | 6/1989 | Nunnelly | C01B 17/0237 425/222 |
| 2005/0039508 A1 | 2/2005 | Burnham et al. | |
| 2013/0019645 A1 | 1/2013 | Crabtree et al. | |
| 2014/0346108 A1 * | 11/2014 | Josse | C02F 3/12 210/605 |

FOREIGN PATENT DOCUMENTS

WO  2011162606  12/2011

OTHER PUBLICATIONS

Amos ("Reporton Biomass Drying Technology", 1998, National Renewable Energy Laboratory (Year: 1998).*

(Continued)

*Primary Examiner* — Jennifer A Smith  
(74) *Attorney, Agent, or Firm* — Hovey Williams LLP (57) ABSTRACT

A liquid fertilizer is produced from off-gassed ammonia resulting from the processing of animal waste materials, particular animal manure. The vaporized ammonia is generated primarily by heating the animal waste materials and capturing the resulting vapors and particulate materials. The ammonia vapors and particles are removed from the gas stream through a scrubbing operation, which creates an ammonium-enriched liquid stream that can be concentrated into an organic fertilizer having a high-nitrogen content.

20 Claims, 2 Drawing Sheets

(56) References Cited

OTHER PUBLICATIONS

Bepex ("Selecting an Indirect Thermal Technology", 2018, accessed from www.bepex.com). (Year: 2018).*

Szogi, Ariel A., Matias B. Vanotti, and Kyoung S. Ro. "Methods for treatment of animal manures to reduce nutrient pollution prior to soil application." Current Pollution Reports 1.1 (2015): 47-56. (Year: 2015).*

Hadlocon, Lara Jane Sebuc. "Production of ammonium sulfate fertilizer using acid spray wet scrubbers." Agricultural Engineering International: CIGR Journal (2015). (Year: 2015).*

Zhao, Lingying. "Wet Scrubbers for Recovering Ammonia Emissions from Poultry Facilities for Nitrogen Fertilizer" Department of Food, Agricultural and Biological Engineering the Ohio State University Dec. 16, 2016 (Year: 2016).*

International Search Report and Written Opinion in corresponding PCT/US2019/018188, dated Apr. 24, 2019.

Martínez-Alcántara, et al., "Production of 15N-Labelled Liquid Organic Fertilisers Based on Manure and Crop Residue for Use in Fertigation Studies", PLoS ONE, vol. 11, issue 3, Mar. 16, 2016.

* cited by examiner

STABILIZED LIQUID AMMONIA FERTILIZER FROM ANIMAL WASTE

RELATED APPLICATION

This application claims the benefit of U.S. Provisional Patent Application No. 62/631,403, filed Feb. 15, 2018, which is incorporated by reference herein in its entirety.

BACKGROUND OF THE INVENTION

Field of the Invention

The present invention is generally directed toward a stabilized liquid ammonia fertilizer and methods of making the same from volatilized ammonia produced during confined animal feeding operations and/or during processing of animal manure into a solid fertilizer product.

Description of the Prior Art

Adequate nitrogen in the contents of soil is necessary for a healthy lawn, plants, and crops. Fertilizers containing nitrogen are used to enhance the nitrogen levels in the soil to produce greener, lusher, faster-growing plants, lawns, and crops. Nitrogen must be available for the plant to use it, meaning that the nitrogen must be converted to $NH_4^+$ or $NH_3$. The nitrogen may be readily available or organisms in the soil must convert the nitrogen into a usable form.

Inorganic fertilizers, while inexpensive and easy to apply, tend to wash the nutrients out of the soil, requiring reapplication on a regular basis. Additionally, since inorganic fertilizers are concentrated, they tend to burn plant roots more than organic materials. Fertilizers that are derived from an organic source are preferable for a variety of reasons. They have a lower burning potential and a lower leach potential; and they replenish the soil with micro-nutrients, essential amino acids, and organic matter that were consumed by previous agricultural and horticultural activity. However, most fertilizers derived from an organic source have a nitrogen content that is less than 3% and the nitrogen is usually in a slow release form. The slow release nitrogen in most fertilizer derived from an organic source must be broken down over time by microorganisms in the soil in order for that nitrogen to be converted to a form that is usable by plants and crops. This element of organic-derived fertilizer pushes many to purchase synthetic fertilizers that provide a higher level of nitrogen and a quicker release into the soil and uptake by the plant.

Animal manure is a well-known organic source for solid fertilizer production as it is a good source of essential micronutrients for plant life. It is common for the animal manure to be processed into pellets or granules and dried prior to packaging, storage, and/or shipping. The drying of the manure inactivates and/or kills pathogens or other microorganisms within the manure thereby enhancing the stability of the resulting solid fertilizer until it can be used for an agricultural purpose. However, a longstanding problem in the processing of animal manure in the manufacture of solid fertilizer is ammonia off gassing. Environmental regulations often prohibit direct venting of volatilized ammonia that is released from the manure during drying into the atmosphere. Therefore, steps must be taken to recover and dispose of these ammonia vapors.

The problem of ammonia off gassing has been addressed previously through the use of acid scrubbers. See, for example, *Development of an Acid Scrubber for Reducing Ammonia Emissions from Animal Rearing Facilities*, from LPE Learning Center (Oklahoma State University), which describes the requirement for addition of a strong acid such as sulfuric acid to remove nitrogen from gaseous poultry waste. In particular, this group found that "two scrubbers (a dust scrubber and an acid scrubber) were needed rather than one" because of the problem of capturing particles at the same time as capturing nitrogen.

However, the use of strong mineral acids, such as sulfuric acids, and other agents such as urea, limits the ability of the recovered nitrogen, in the form of a liquid ammonium solution, to be used in certified organic agricultural applications. The United States Department of Agriculture ("USDA") sets strict guidelines as to materials that may be registered as "USDA organic" pursuant to the National Organic Program, particularly materials that are permitted to be present in fertilizers of this designation. See, www.ams.usda.gov/nop section 205.605.

Accordingly, there is a need in the field of fertilizer product for being able to recover volatilized ammonia from animal manure and prepare a liquid fertilizer product that meets USDA guidelines for organic fertilizer certification.

SUMMARY OF THE INVENTION

According to one embodiment of the present invention there is provided a method of processing manure, which comprises quantities of water and ammonia, or aqua ammonia, or aqueous ammonia, into a liquid fertilizer composition. The method comprises heating the manure to vaporize at least a portion of the water and ammonia contained therein and generate fine carbonaceous particles. The vaporized water and ammonia and fine carbonaceous particles are contacted with a liquid water stream and the ammonia and fine carbonaceous particles are dispersed within the liquid water stream to form a nitrogen-rich liquid. Water is then removed from the nitrogen-rich liquid to form the liquid fertilizer composition.

According to another embodiment of the present invention there is provided a method of making a liquid fertilizer comprising providing granules of a ground animal waste comprising water and ammonia, or aqua ammonia, or aqueous ammonia. The granules are then heated by passing over the granules a heated air stream having a temperature of from about 100° F. to about 450° F. The heating step vaporizes at least a portion of the water and ammonia contained within the granules and generates animal waste dust particles. The heating step reduces the moisture content of the granules to below 10% by weight. The heated air stream containing the water vapor, ammonia vapor, and dust particles is directed to a wet scrubber. The heated air stream is contacted, within the wet scrubber, with a liquid water stream. The ammonia and dust particles are dispersed within the liquid water stream to form a nitrogen-rich liquid. At least a portion of the dust particles are removed from the nitrogen-rich liquid so as to achieve a suspended solids concentration within the nitrogen-rich liquid of less than 15,000 ppm. Water is removed from the nitrogen-rich liquid to form the liquid fertilizer.

In yet another embodiment of the present invention there is provided an aqueous liquid fertilizer having a pH of from 5 to 7 that comprises at least 3% by weight solubilized nitrogen derived from animal waste. The solubilized nitrogen is in the form of ammonium ions, wherein at least 5% of the nitrogen contained in the fertilizer is of the N-15 isotope.

DETAILED DESCRIPTION OF THE PREFERRED EMBODIMENT

Figure 1:
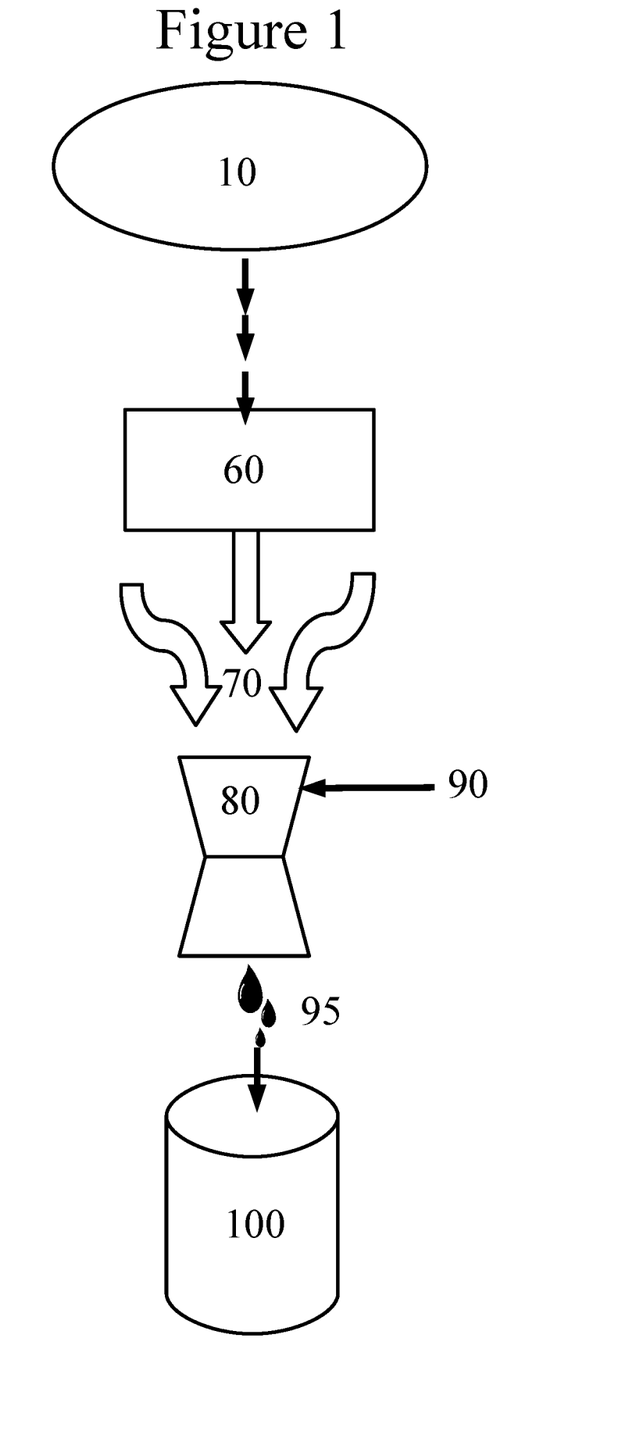
FIG. 1 is a schematic illustration of a process for treating animal waste for producing a liquid fertilizer product according to an embodiment of the present invention.

FIG. 1 illustrates an exemplary process for treating animal waste in accordance with an embodiment of the present invention. The process illustrated in FIG. 1 is generally operable to produce both solid and liquid fertilizer products from a common feedstock. An animal manure feedstock 10 is processed by one or more steps (shown as multiple arrows below feedstock 10) into a solid fertilizer material. Animal manure feedstock 10 preferably is carbonaceous animal waste excrement such as from cow, pig, horse, poultry, human, or other animals. Preferably this waste qualifies as an input for organic registered fertilizer for use in certified organic production and does not contain unacceptable additives such as sulfuric acid, phosphoric acid, metals, antibiotics, growth hormones, insecticides and the like. In a preferred embodiment the manure waste is poultry waste.

The animal manure feedstock 10 comprises ammonia and is generally moist, having a moisture content that exceeds generally accepted standards for packaging and/or being considered shelf-stable. In certain embodiments, in order to prevent premature ammonia volatilization, the manure feedstock 10 is treated so as to minimize generation of ammonia. However, it is also within the scope of the present invention for the manure feedstock 10 not to have undergone any such pretreatment and to be off-gassing ammonia. Preferably, animal manure is treated without addition of non-organic mineral and organic acids and preferably without adding a source of sulfate, such as sulfuric acid and ammonium sulfate, or phosphoric acid.

The animal waste used in feedstock 10 may comprise a range of nitrogen and sulfur content. For example, dried poultry waste often has a nitrogen content of from about 1% to about 8% by weight on a dry basis, and more often from about 3% to about 6% by weight on a dry basis. The sulfur content of poultry waste often ranges from about 0.3% to about 1% by weight on a dry basis, and more often from about 0.5% to about 0.75% by weight on a dry basis. The amount of carbon-containing materials is much higher. For example, lignocellulosic materials (including cellulose, hemicellulose, and lignin) often comprise from about 10% to about 37% by weight of the animal waste on a dry basis. Despite the high levels of carbon in the feedstock, there apparently has been no serious effort to use the carbonaceous material during processing for reacting with other components in order to improve fertilizer quality. Instead, additional sources of carbon such as citrate often are added to manure to improve quality, but this adds additional costs and complexity to processes that convert manures to fertilizer.

It is also within the scope of the present invention for the animal manure feedstock to comprise a carbonaceous plant waste such as citrus processing waste (e.g., citrate), vegetable processing waste and seaweed processing waste (e.g., alginate). According to one embodiment, the addition of plant waste results in a decrease in the pH of the nitrogen-rich liquid within the wet scrubber (described in further detail below) to a level of from about 4 to about 6.

Preferably, the feedstock is processed before a heat killing/drying step that produces fines and off-gassed ammonia. For example, additional sulfur and other materials may be added to the animal manure feedstock in a mixing step upstream of the dryer.

As noted above, the animal manure feedstock 10 can be treated by any of a number of processes, such as addition of organic acids or anhydrides thereof, such as citrates, titration by another weak acid or base, or addition of a sulfur compound. Exemplary acids that can be applied to the manure feedstock to adjust pH include citric acid, acetic acid, phosphoric acid, carbonic acid, hydrochloric acid, nitric acid, sulfuric acid, complex mixtures of organic acids obtained from other agricultural processes, or a combination thereof. In these embodiments in which the feedstock is treated with an acid, it is preferable for the manure feedstock 10 to have a pH of from about 4 to about 7 prior to heat treatment step 60 (described below). However, in other embodiments, it is preferable for no acid and for no sulfur compounds to be added to the feedstock.

In certain embodiments, it is possible for the feedstock to have undergone further processing steps in which other macronutrients have been added which are desirably present in solid fertilizer materials such as potassium phosphorus, and sulfur. These macronutrients may be added during various mixing, granulations, prilling, or dissolving steps that are well known in the fertilizer manufacturing industry. Preferably, these additional steps are carried out at temperatures low enough to avoid significant out-gassing of ammonia. However, it is possible to perform processing on the feedstock that does result in significant out-gassing of ammonia. Such operations, though, should be carried out in the presence of apparatus comprising ductwork and air management equipment that is operable to capture the ammonia vapors and combine them with vapors and fine particulate matter 70 generated by heating step 60 (explained further below).

Next, the animal manure feedstock 10 undergoes a heating step 60, the primary goal of which is to kill undesirable microorganisms and dry the feedstock into a solid fertilizer product. However, heating step 60 also results in the generation of various vapors and fine particulate matter 70, namely water vapor, ammonia vapor, and carbonaceous animal waste (e.g., manure dust particles or animal bodies or parts thereof). Heretofore, the loss of ammonia vapors has been considered a problem as it cannot be directly discharged into the atmosphere due to environmental regulations and is difficult and expensive to capture and recover for meaningful use, as a fertilizer or otherwise. Thus, many conventional processes for ammonia removal from the animal waste rely on aerobic or anaerobic digestion at this stage, which may be considered low heat processes, but do require more time and energy (namely, mechanical energy input by way of pumps, agitators, aerators, etc.) to perform.

In contrast, step 60 is a relatively high-heat process that employs high enough temperatures that result in significant off gassing of both water and ammonia vapors from the wet manure feedstock. In certain embodiments of the present invention, the processed manure from feedstock 10 preferably is heated from about 100° F. to about 450° F., and more preferably from about 160° F. to about 400° F. by application of external heat. Preferably, this heating step is carried out for less than six hours, more preferably for less than 2 hours, and yet more preferably for less than 1 hour. During this drying time, water, ammonia vapors and animal waste particles 70 are generated and then directed toward a wet scrubber 80 as shown in FIG. 1.

A variety of high-heat treatment methods and devices are known to the skilled artisan and are contemplated for use by the present invention. The heating step 60 may utilize, for example, electric or gas heaters, jets, or hot air streams which can be directed specifically at a treatment area such as a moving conveyor belt transporting treated manure through a heating tunnel. Also useful are waste heat sources, solar heat sources, and geothermal heat sources. Exemplary waste heat sources include flue gases from gas turbines in power plants and incinerators, process gases of chemical and metallurgical operations and waste heat from other industrial processes. Most preferred is a gas-fired controlled natural gas or propane burner into a rotating drum dryer. Hot air being exhausted from the drum dryer contains water and ammonia vapor and fine particulate matter and effectively functions as a raw material for manufacture of the liquid fertilizer composition of the present invention.

The animal manure feedstock 10 may be produced on location in a confined animal feeding operation (CAFO) and air from the CAFO can be added to the vapors and fine particulate matter 70 created by processing of animal waste via heating step 60. In one embodiment of the invention, the process illustrated in FIG. 1 is carried out by equipment on location at cattle, ovine, poultry, or other animal feeding operation facilities. In this embodiment, ammonia vapors present in the air at the CAFO can be captured and combined with the ammonia vapors in stream 70. Thus, in preferred embodiments of the present invention, not only is ammonia captured from heating step 60, but also fugitive ammonia is captured from air inside the CAFO through a duct system and transported for processing and recovery.

It is within the scope of the present invention to introduce plant waste into the vapor stream 70 in the form of particles in water. The wet particulate plant waste is mixed with the ammonia vapor and provided in a gas phase to the venture scrubber 80. Without being bound by any particular theory, it is believed that the carbonaceous material in the dust particles and optional plant waste bind with the ammonia present in the vapor phase and assist with its incorporation into the ultimate liquid fertilizer product.

Generally, the ammonia and water vapor and fine particulate material 70 then are transported and introduced into a wet scrubber 80, preferably a venturi scrubber. Optionally, other carbonaceous material, such as the plant material described above or fine particulate material from other areas of the CAFO facility may be introduced into scrubber 80 as well.

The vapors and fines enter venturi scrubber 80 where they are combined with liquid water 90. A combined aqueous product 95, which is enriched in nitrogen, preferably ammoniacal nitrogen, leaves scrubber 80 and is collected by container 100. Although one scrubber is shown in FIG. 1, a second scrubber may be employed in certain embodiments. In one particular embodiment, air 70 enters a first scrubber 80 (preferably without acid addition to lower pH) and the output air from scrubber 80 enters a second scrubber (not shown). Optionally, the second scrubber uses water that has been acid treated to a pH below 6.

The treatment methods described herein can comprise multiple individual steps. Unless recited otherwise, the steps can be performed in any order. Multiple individual steps can be combined into a single step, and certain steps are optional, depending upon, for example, the animal waste product to be treated and the desired properties of the resulting product.

As mentioned above, a preferred type of wet scrubber for use with the present invention is a venturi scrubber. A venturi scrubber accepts the water and ammonia vapors at one end, preferably a top end, and adds a water spray while undergoing a pressure drop as the mixture passes through a throat section.

In one embodiment of the present invention, fine particulate matter removed from one or more processes associated with animal waste feedstock processing are hydrated prior to entry into the scrubber. For example, the particles may be precipitated, exposed to saturating humidity, bubbled via an air jet through water, or otherwise contacted with water. Subsequently, the particles may be applied to the scrubber via one or more air jets, water jets, atomizers or added to the main water input 90 as shown in FIG. 1.

FIG. 1 shows a preferred scrubber 80 that accepts vapor (both water and ammonia) and fines in an inlet (not shown) at the top. Water 90, preferably at a temperature of from about 40° F. to about 140° F., more preferably at a temperature of from about 80° F. to about 120° F., enters the scrubber and mixes with the vapor. In a preferred embodiment no acid is introduced into the scrubber at this step. However, it is also within the scope of the present invention to add an acid, such as citric acid, to the water 90 at this stage. It was surprisingly found that in many cases, the carbonaceous fines from a heating step as described herein, could sorb (i.e., absorb, adsorb, or absorb and adsorb) much or most of the ammonia in the form of ammonium bound to the carbonaceous material from the animal waste, without any further pH change.

In certain embodiments, water 90 preferably is recycled water from the fertilizer making process such as water recovered from one or more drying steps. The amount of water 90 added to scrubber 80 primarily is determined by the percentage of solids desired in output water 95. In a preferred embodiment with a venturi scrubber, solids in output water 95 are kept to less than 4% by weight and more preferably to no more than 3% by weight. The concentration conveniently can be adjusted by controlling water input at the throat of the venturi scrubber.

The harvested ammoniated fluid (shown as 95 in FIG. 1) optionally undergoes solids removal step before being concentrated into the final liquid fertilizer product. The ammoniated fluid generally has suspended and dissolved solids including, but are not limited to nitrogen, phosphate, potash, secondary nutrients, micro-nutrients and organic matter found in anaerobically digested manure or other agriculturally related organic waste. Preferably, the fluid is at a temperature of from about 80° F. to about 132° F.

Preferably the output water 95 is filtered by for example a screen, ultrafilter or a centrifuge to remove the solids. Other techniques may be used, with the object of filtering the fluid to allow its eventual use as a liquid fertilizer that can flow through drip irrigation tape. Suspended solids optionally are removed by any of a large variety of mechanisms. In certain preferred embodiments, the suspended solids are filtered out by a 270 Dalton membrane under 500 psi of pressure. Other screens as known by skilled artisans may be used. The removed suspended solids can be further processed to produce granular fertilizers. Multiple concentration steps such as centrifugation or filtration steps may be employed wherein a first step removes large suspended solids (greater than 24 microns), a second step removes small suspended solids (less than 24 microns), and a possible third step removes any residual solids. Preferably, the suspended solids are removed using one or more filtration mechanisms including, but not limited to, mechanical screening, microfiltration, ultrafiltration, nanofiltration, reverse osmosis, membrane separation, and electro-coagulation. In one embodiment of the present invention, a second concentration or filtration step preferably removes material of a size that may disrupt, impede, or block an irrigation system. Such filtering processes are exemplified by the use of a 200-mesh screen, membrane filters, continuous agitation through turbulent flow, or reverse osmosis, with or without a self-cleaning method of filtration. Reverse osmosis is a preferred third filtration step.

Examples of machinery for removing suspended solids include: the BioPulse system from Bioprocess H2O (Portsmith, R.I.); Petro Membrane Bioreactor ("MBR") (Siemens Industry, Inc. USA); PURON MBR (Koch Membrane Systems, Inc., Wilmington, Mass.); Pall Aria Integrated MF/NF (microfiltration/nanofiltration) and MF/RO (microfiltration/reverse osmosis) systems (Pall Corporation, Port Washington, N.Y.); Alfa Laval Filtration (Alfa Laval, Sweden); and NF (nanofiltration) and RO (reverse osmosis) Membrane Separation (BKT Co Ltd, Korea).

The large suspended solids, hereinafter called "recovered solids" generally are greater than 24 microns in size (largest axis more than 24 microns). The recovered solids preferably have a moisture content of from about 70% to 90% moisture, or about 80% (for example, 75-85%) moisture.

Preferably the recovered solids are added back to the fertilizer production process such as just before or during the mixing step (see, e.g, FIG. 2 at mixer 240) where other components are added to a ground manure feedstock. In another embodiment, the recovered solids are dewatered in a twin-screw helical extruder to produce granular fertilizer having a moisture content of up to 10%, and preferably no more than 5%. In one preferred embodiment, hot oil flowing around the ducts of this extruder is used to support the dewatering of the recovered solids, and in other embodiments, other sources of additional heat can be used. The rotation of helical screws of this type of extruder causes solids to bind together to form granules which may be suitable for fertilizer use. Ammonia-rich exhaust gas created by this process preferably is collected by air ducting and added as further input to the scrubber. Alternatively, the exhaust gas can be cooled and added to the liquid filtrate.

Following the procedure of FIG. 1, a liquid fertilizer containing at least 0.5% ammonium as a liquid 95 can be obtained. It was surprisingly discovered that the liquid ammonium-enriched liquid 95 that exits venturi scrubber 80 had a level of nitrogen that was an excellent liquid fertilizer for plants. After exiting scrubber 80, liquid 95, which may comprise from about 0.5-3% nitrogen, is collected in container 100 to await concentration to a desired level, preferably 6%, 12%, and even up to 16% nitrogen.

After optional solids removal, the ammonium-enriched liquid can be concentrated by an evaporator. Evaporation may be achieved by any process that removes water from the composition. Preferably, the concentrated material is in liquid form after evaporation. Vacuum evaporation is preferred. A preferred concentration method includes the use of an Alfa Laval single-effect vacuum evaporator followed by a condenser. Steam is introduced on one side of the heat exchanger while a feed of the concentrated material is introduced to the other side of the heat exchanger under vacuum. The transfer of heat from the steam to the concentrated material under vacuum, boils off water which is carried to the second stage condenser where it is cooled and re-liquified. This liquid is removed from the system, and may be directed to a reverse osmosis (RO) process for final cleaning. The concentrate from the RO process, which may include dissolved ammonium, can be added to the final liquid fertilizer. The permeate from the RO system is recycled through the venture scrubber as water 90. The material remaining in the evaporator is now a highly concentrated ammonia product containing, in certain embodiments, up to 16% ammoniacal nitrogen, although greater concentrations can be achieved if desired.

Other vacuum evaporators that can be used with the present invention include, but are not limited to, vacuum evaporators made by Veolia Water Solutions and Technologies (Cary, N.C.), HF Pure Water (Compton, Calif), Mech-Chem Associates (Norfolk, Mass.), and Econ Industries (Starnberg, Germany). The evaporation process uses heat to remove water. Preferably evaporation is done at a temperature (of heated air or heated evaporating material) of from about 90° F. to about 155° F., or from about 100° F. to about 135° F., or from about 105° F. to about 120° F. In certain embodiments, it is preferable for the evaporation to be performed at a temperature of from about 100° F. to about 105° F.

In a vacuum evaporation process embodiment, heating occurs during application of a vacuum of from about 10-30 inches of mercury, with the preferred range being from about 27-28 inches of mercury. Evaporation time depends on the temperature and pressure applied and can be determined according to industry standards. Preferably, water vapor removed from the evaporation process is captured and used directly or further transformed by the use of a RO system into potable water. Water vapor created from the evaporation step is cooled and condensed into a liquid state. The water that results from this step is clean and suitable for drinking.

Methods of fertilizer production from animal waste may include the addition of an acid such as sulfuric acid, phosphoric acid, citric acid, and the like. Such acid has a variety of uses including generating heat, killing microorganisms, stabilizing the product, facilitating reactions, and immobilizing nutrients such as ammonia. Acid is often added at an early stage of fertilizer product from manure while the material is in a wet form. Such acid additions may be practiced with the present invention. However, it is also within the scope of the present invention for no acid to be added to either the feedstock or to the scrubber. In a particularly preferred embodiment of the present invention, it was surprisingly discovered that a high level of ammonia could be immobilized or fixed without the addition of acid to the feedstock or the scrubber. This surprising discovery not only results in cost savings. However, acid may be added before or after application of material to a venturi scrubber stage, as described for example by Crabtree et al. in U.S. Patent Application Publication No. 2013/0019645, entitled "Organic Liquid Fertilizer and Process of Making," the entire contents of which, and particularly details of manure manipulation and drying/concentration steps are incorporated by reference in its entirety.

Figure 2:
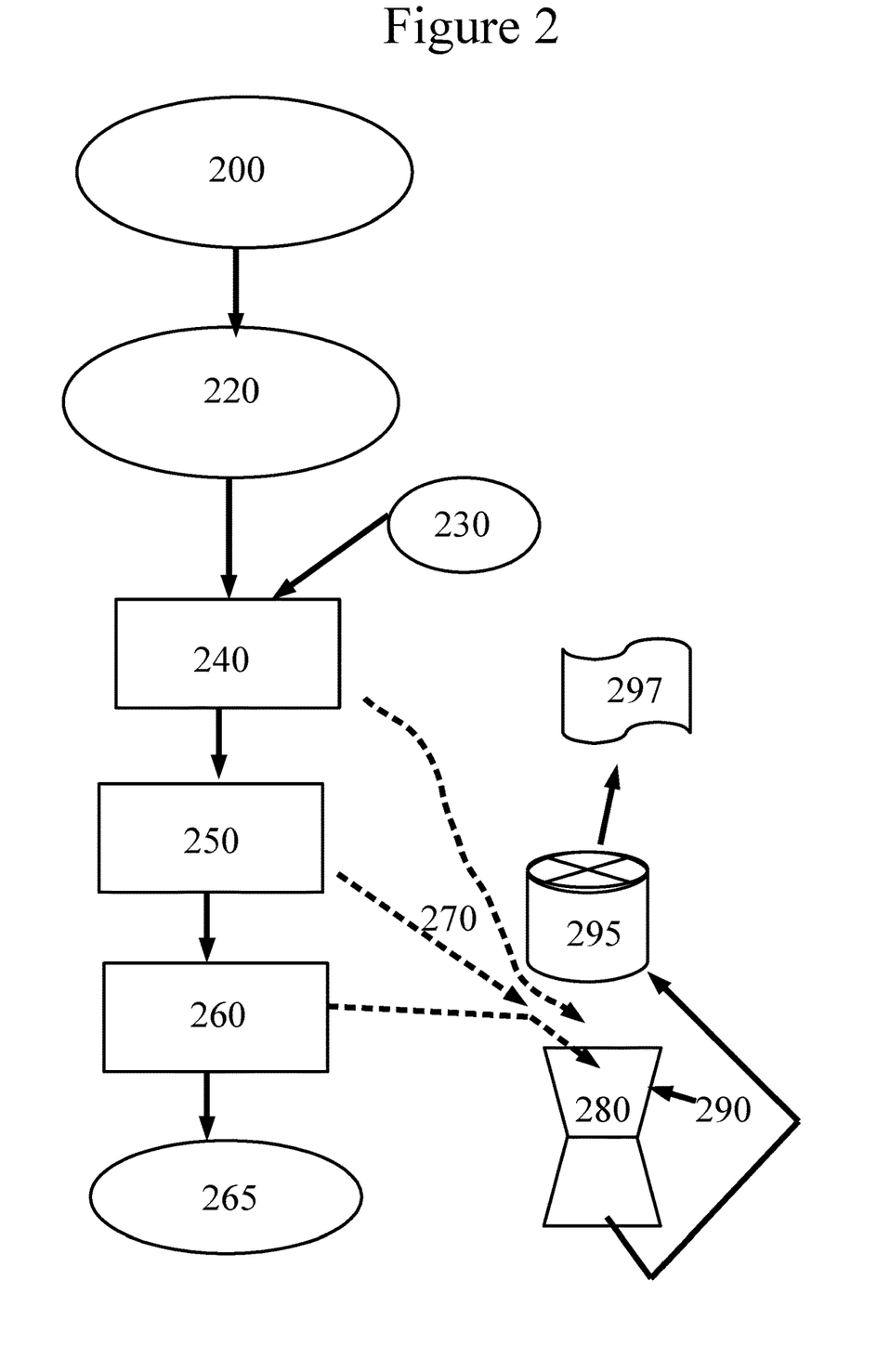
FIG. 2 is a schematic illustration of another embodiment of the present invention wherein animal waste is processed and a liquid fertilizer product is recovered.

FIG. 2 illustrates an embodiment of the present invention in which a concentrated liquid fertilizer from a poultry waste feedstock is prepared. The process of FIG. 2 begins with poultry manure feedstock 200 being ground into a standardized material 220. The ground material enters mixer 240. Other, optional additives 230, such as those described above, may be added to material 220 in mixer 240. The output of mixer 240 is passed to granulator 250. Duct hoods may be placed above the equipment such as feedstock grinder 220, mixers 240, and reactors that mix the feedstock with other ingredients, and other machinery such as prillers, granulators, pelletizers, and machines that alter the shape of the material. Volatized ammonia is pulled from inside and around those machines as well as dust (fine particulate material) generated by these other processes. Duct work collects ammonia and dust in two or more distinct legs shown as separate arrows 270 in FIG. 2. A first leg collects dust from hoods around processing machinery. A separate leg pulls air from a dust collector, such as a cyclone positioned just after a dryer such as a dryer drum. The legs merge and feed a venturi scrubber 280 that preferably has on its opposite side a fan that creates a suitable air pull.

Heater 260 drives off water vapor, ammonia vapor and solid particulate material 270, which are collected via air ducts and moved to the input of scrubber 280. Meanwhile, heated and dried fertilizer 265 is collected and bagged. The collected fines and ammonia 270 become wetted within scrubber 280 and are diluted, preferably, to 3% or less solids with added water 290. In a preferred embodiment, the nitrogen concentration of the nitrogen-rich liquid from scrubber 280 is from about 0.3% to 0.75% by weight, preferably from about 0.4% to about 0.6% by weight.

Nitrogen-rich liquid from scrubber 280 preferably is concentrated by a centrifuge, filtered by a screen filter, ultrafilter or other device 295 and then processed by an evaporator 297. Achieving the desired concentration of nitrogen from the scrubber can be implemented by a variety of techniques, but preferably a solids removal step to remove at least 50% of the non-dissolved material, preferably at least 75% and more preferably at least 90% of the non-dissolved material precedes the evaporation step 297. By removing the non-dissolved solids according to this procedure, a nitrogen-enriched liquid produced from scrubber 280 having a nitrogen content of from 0.5-3% by weight can be transformed successfully into a liquid fertilizer composition having a minimum nitrogen concentration of 6% by weight. In this process, the nitrogen-enriched liquid from scrubber 280 is passed through a screen filtration step 295 in which the desired amount of non-dissolved solids is removed.

Without wishing to be bound by any one theory for operation of the claimed invention, it is believed that a large proportion (at least 25%, preferably 25-75%) of the ammoniacal nitrogen binds to carbonaceous material obtained from the fines, and subsequently wets in the venturi scrubber and that this product can be concentrated to unusually high levels into a liquid that can be used as a fertilizer product.

This solids nitrogen-rich liquid output may be temporarily stored in a holding tank (not shown) and/or directly passed to concentrator 295 wherein solids are removed, and then passed to evaporator 297, to give a final nitrogen concentration of preferably approximately 6% or more.

According to one embodiment of the present invention, the liquid fertilizer product comprises from about 2.5% to about 3.5% by weight sulfur. Preferably, the sulfur present is derived from the animal waste and can be useful for binding up ammonia in a form that allows its use as a high-nitrogen liquid fertilizer. About half of the nitrogen present in the fertilizer (preferably 25%-75%, more preferably 35%-65%) is in the form of ammonium ions. Preferably the ammonium is in a stable form, without sulfate, but has a stability similar to that of ammonium sulfate. For example, the at least half of the nitrogen in a fertilizer embodiment of the present invention can replace ammonium sulfate for agricultural use as fertilizer. In a particular embodiment, the ammonium product upon application to soil as a fertilizer dissolves at least 10% as fast as ammonium sulfate in moist soils of pH 7.

The product is similar to ammonium sulfate in effects, as described for example in *The Fertilizer Encyclopedia* p. 52 By Vasant Gowariker, V. N. Krishnamurthy, Sudha Gowariker, Manik Dhanorkar, Kalyani Paranj ape John Wiley & Sons Apr. 8, 2009. This reference describes how ammonium nitrogen from ammonium sulfate "is adsorbed on soil colloids, clay and humus, replacing calcium. It is more beneficial than nitrate fertilizers at planting time. This adsorbed portion is slowly released and in about a month most of the ammonium sulfate is converted into the nitrate form, which is used by growing plants." The term "slowly releases nitrogen upon application to soil" in this context means that at least half of the nitrogen remains in a form unavailable to the plant after application to the soil as a liquid fertilizer. In an embodiment the carbonaceous ammonium product is adsorbed on soil colloids, clay and humus, replacing calcium at least 50% as well as ammonium from ammonium sulfate. In an embodiment the liquid fertilizer ammonium as described herein can replace ammonium sulfate as a fertilizer in providing nitrogen to a plant and is at least 50% as efficacious in doing so. More preferably at least five days is required for release and conversion of half of the nitrogen into a form suitable for plant uptake. Preferably less than 10% is released as ammonia to the air.

Nitrogen in ammonium ion form preferably comprises more than 4%, more preferably from about 4% to about 10%, more preferably from about 4% to about 6%, and most preferably about 6% nitrogen by weight of the liquid fertilizer. In a particular embodiment, however, the liquid emerging from the scrubber is concentrated to a final nitrogen content of up to 6%, 10%, 12%, 15% and even 16% by weight.

In certain embodiments, the liquid fertilizer contains dissolved solids. In such embodiments, the liquid fertilizer contains from about 40,000 ppm to about 750,000 ppm dissolved solids, from about 100,000 ppm to about 700,000 ppm dissolved solids, from about 200,000 ppm to 690,000 ppm dissolved solids, or from about 300,000 ppm to about 680,000 ppm dissolved solids. It is generally preferred that these embodiments of the present invention of the liquid fertilizer contain at least 40,000 ppm of dissolved solids.

However, alternate embodiments of the liquid fertilizer comprise little to no suspended solids. In these embodiments, the liquid fertilizer comprises from 0 ppm to about 20,000 ppm suspended solids, more preferably less than 15,000 ppm, more preferably less than 13,000 ppm and most preferably less than 12,000 ppm, more preferably less than 10,000 ppm, still more preferably less than 5,000 ppm, and still more preferably less than 3,000 ppm. In a preferred embodiment the liquid fertilizer has no suspended solids.

In certain embodiments, the liquid fertilizer comprises from about 0.001% to about 0.5%, preferably from about 0.01% to about 0.25%, most preferably from about 0.05% to about 0.1% by weight of a nitrogen-carbonaceous material complex, wherein the carbonaceous material is derived from the animal waste, such as the manure dust generated during the heating of the animal manure described above. However, it is also within the scope of the present invention for the carbonaceous material to be any other carbonaceous material described herein, namely various plant wastes, that has been added to any process stream in order to assist with recovery of ammonia.

In certain embodiments, the liquid fertilizer may contain potash. The potash preferably is soluble potash. The potash preferably is present in an amount from about 1% to 10% by weight, most preferably about 5% by weight. Sulfur may be present in the liquid fertilizer. Sulfur preferably is present in the liquid fertilizer in an amount between 1 and 5% by weight.

The liquid fertilizer preferably has a pH of between pH 3 to pH 8, more preferably from about pH 5 to pH 7, and most preferably about pH 6.5. The fertilizer preferably lacks pathogens. In a preferred embodiment, if the fertilizer is inoculated with pathogens or come to be otherwise contaminated with pathogens, such pathogens die within 24 hours of addition to the fertilizer.

Additionally, the fertilizer may be registered by the United States Department of Agriculture ("USDA") as "USDA organic" pursuant to the National Organic Program, which specifies materials that are allowed in fertilizer (see www.ams.usda.gov/ nop section 205.605). In a preferred embodiment, the high nitrogen liquid fertilizer is eligible as a USDA Organic Registered Input for use in Certified Organic Production. Fertilizer manufactured as described herein was found to have a high of $N_{15}$ to $N_{14}$ ratio, indicating that the nitrogen is of biological origin. In an embodiment more than 5% of the nitrogen is of the N-15 isotope. Preferably more than 10% of the nitrogen is of the N-15 isotope and more preferably at least 15% of the nitrogen is of the N-15 isotope. In certain embodiments, the liquid fertilizer comprises less than 1%, less than 0.1%, less than 0.01% by weight, or is essentially free of solubilized ammoniacal nitrogen derived from urea.

"Organic" or "Organically derived," refers to a natural source of starting material for the fertilizer. A final organic fertilizer product as described herein is made from feedstock that comprises one or more of plant and animal bi-products, rock powders, seaweed, inoculants, conditioners, dairy product waste, livestock manure, liquid manure, worm castings, peat, guano, compost, blood meal, bone meal, fish meal, decomposing crop residue, cheese whey, dairy product waste, livestock manure, mixed liquor from food and livestock processing facilities, waste waters from a variety of food processing operations, and combinations thereof.

"Ammonium nitrogen" or "ammoniacal nitrogen" refers to nitrogen that is provided to the plant in a water-soluble form, where the ammonium nitrogen includes ammonium ion and/or ammonia. The ammonium nitrogen is readily plant available. In an embodiment most of the nitrogen is converted into nitrate form before plant uptake. In an embodiment the nitrogen carbonaceous complex described herein formed between the carbonaceous particulate material and the sorbed ammonium nitrogen is superior than ammonium sulphate for uptake as can be measured by root uptake studies. In an embodiment fertilizer as described herein are superior by virtue of supplying not only nitrogen source but also carbon in a form suitable for use by soil microbes.

"Suspended solids," are particles that do not pass through a 270 Dalton membrane under 500 psi of pressure at room temperature. "Dissolved solids," are particles that are smaller than the suspended solids, or particles that will pass through a 270 Dalton membrane under 500 psi of pressure at room temperature.

EXAMPLES

The following examples set forth exemplary processes for producing liquid ammonia fertilizers according to the present invention. It is to be understood, however, that these examples are provided by way of illustration and nothing therein should be taken as a limitation upon the overall scope of the invention.

Example 1—2% Nitrogen Fertilizer

In this example raw poultry manure from layer hens is used that lacks litter, arsenic and growth hormones that other manures contain. The raw product is supplied for processing daily, to ensure feedstock consistency.

During the initial stage of processing, poultry manure optionally supplemented with fish, is added as the raw feedstock. The feedstock is physically transformed into a standardized material through the use of a grinder. A representative grinder and details for embodiments of manure feedstock manipulation are described in U.S. Pat. Nos. 8,246,711, and 8,425,648, and U.S. Patent Application Publication No. 2018/0086675, the contents of which are incorporated by reference in their entireties. The grinder creates a more uniform material and reduces particle size. In the grinding step, preferably, volcanic ash is added at a level of up to 5% by weight based upon the gross feedstock weight.

After all ingredients are mixed, they are conveyed into a granulator. After granulation, the product is introduced to a heating/drying process. The heating/drying process destroys pathogens and completes the transformation through an addition of 15 million BTU/hour of thermal energy. Energy is applied through a controlled propane burner into a rotating drum dryer. This allows the product to reach 185° F. for 35 minutes, reducing the moisture content to below 10%, exceeding NOP standards of 165° F. and a maximum moisture level of 12%.

Dried fines from the drying process exit the dryer in a heated air stream at 185° F. and are then saturated with 55° F. water within a static blending system (venturi scrubber) at 200 gpm. The heated air stream is recirculated in the venturi scrubber until the particulates become suspended within the water and the nitrogen (present as ammonia in the heated air stream) becomes solubilized and/or bound to the dissolved solids in the form of $NH_4$. It was surprisingly found that carbonaceous fines added from the drying process allow binding of released ammonia without addition of acid such as citrate.

As a quality control measure, the solids content of the water stream in the venture scrubber are not permitted to exceed 3%. This ensures that the liquid product discharged from the venture scrubber will maintain an analysis of greater than 2% nitrogen concentration. The flow rate of solution from the venturi scrubber is approximately 3 gallons per minute (preferably 1-5 and more preferably 2-4) and the temperature of the solution is approximately 125° F. (preferably 90-200° F. and more preferably 115 to 135° F.).

A solution containing the 2% nitrogen concentration that was prepared according to this example was submitted to the Washington State Department of Agriculture. This sample received a Material Registration Certificate and is listed to comply with the USDA National Organic Standards (7 CFR Part 205).

Example 2—6% Nitrogen Fertilizer

The 2-0-0 liquid fertilizer prepared according to Example 1 was pumped into an insulated tank. The material was then fed into a centrifuge at the rate of approximately 3 gallons per minute in order to remove suspended particulate matter. The particulate matter was pumped back to the beginning of the granulation process and recycled to the animal waste feedstock. The liquid solution exiting the centrifuge at about 3 gallons per minute was fed into a vacuum evaporator operating at 0.15 bar and 127° F. As the 2-0-0 solution was heated, water was evaporated from the solution while the nitrogen remained in the solution. Approximately 66% of the water in the 2-0-0 solution was removed in the vacuum evaporator. Water vapor collected from the evaporator was then passed through a cooling tower and condensed. This condensate was treated by reverse osmosis (RO) to remove any remaining nitrogen (RO concentrate), which was added to the final liquid fertilizer product from the vacuum evaporator. The RO permeate flow from the RO equipment is clean water that is then used in the venturi scrubber process. The output from the vacuum evaporator is a 6-0-0 liquid fertilizer product.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

We claim:

1. A method of processing manure comprising water and ammonia into a liquid fertilizer composition comprising the steps of:
    (a) reducing the pH of the manure to generate ammonium from the ammonia;
    (b) heating the manure to vaporize at least a portion of the water contained therein, generate fine carbonaceous particles having ammonium sorbed thereon, and disperse the fine carbonaceous particles in an air stream;
    (c) contacting the air stream comprising the vaporized water and fine carbonaceous particles with a liquid water stream and dispersing the carbonaceous particles within the liquid water stream to form a nitrogen-rich liquid, wherein the air stream comprising the vaporized water and the fine carbonaceous particles processed in step (c) is unmodified from step (b); and
    (d) removing water from the nitrogen-rich liquid to form the liquid fertilizer composition.

2. The method of claim 1, wherein the method further comprises the step of removing at least a portion of the carbonaceous particles from the nitrogen-rich liquid.

3. The method of claim 2, wherein the step of removing at least a portion of the carbonaceous particles from the nitrogen-rich liquid comprises one or more centrifugation or filtration steps.

4. The method of claim 3, wherein the portion of the carbonaceous particles removed from the nitrogen-rich liquid are recombined with the manure.

5. The method of claim 2, wherein the step of removing at least a portion of the carbonaceous particles comprises forming a liquid fertilizer composition that comprises less than 15,000 ppm of suspended solids.

6. The method of claim 1, wherein the step of heating the manure comprises heating the manure to a temperature from about 100° F. to about 450° F.

7. The method of claim 1, wherein the heating step is carried out using a rotating drum dryer.

8. The method of claim 1, wherein the water vapor and carbonaceous particles from the heating step are conducted away from the manure and directed toward a scrubber in which the contacting step is performed.

9. The method of claim 8, wherein the scrubber is a venturi scrubber.

10. The method of claim 1, wherein the step of removing water from the nitrogen-rich liquid comprises concentrating the nitrogen-rich liquid to a total nitrogen concentration of about 4% to about 16% by weight.

11. The method of claim 1, wherein the moisture content of the manure is decreased during the heating step from above 25% to below 10% by weight.

12. A method of processing manure comprising water and ammonia into a liquid fertilizer composition comprising the steps of:
    (a) reducing the pH of the manure to generate ammonium from the ammonia;
    (b) heating the manure to vaporize at least a portion of the water and ammonium contained therein;
    (c) introducing fine carbonaceous particles into the vaporized water and ammonium and causing at least a portion of the ammonium to become sorbed thereon thereby forming a stream comprising the fine carbonaceous particles having ammonium sorbed thereon;
    (d) contacting the stream comprising the fine carbonaceous particles having ammonium sorbed thereon with a liquid water stream and dispersing the carbonaceous particles within the liquid water stream to form a nitrogen-rich liquid, wherein the stream comprising the fine carbonaceous particles processed in step (d) is unmodified from step (c); and
    (e) removing water from the nitrogen-rich liquid to form the liquid fertilizer composition.

13. The method of claim 12, wherein the fine carbonaceous particles are selected from the group consisting of animal waste fines obtained from an animal waste to solid fertilizer manufacturing process, vegetable waste fines obtained from a vegetable processing process, mechanically disrupted seaweed, and citrus waste fines obtained from a citrus processing process.

14. The method of claim 12, wherein the method further comprises the step of removing at least a portion of the fine carbonaceous particles from the nitrogen-rich liquid.

15. The method of claim 14, wherein the portion of the fine carbonaceous particles removed from the nitrogen-rich liquid are recombined with the manure.

16. The method of claim 14, wherein the step of removing at least a portion of the carbonaceous particles comprises forming the liquid fertilizer composition such that the liquid fertilizer composition comprises less than 15,000 ppm of suspended solids.

17. The method of claim 12, wherein the step of heating the manure comprises heating the manure to a temperature from about 100° F. to about 450° F.

18. The method of claim 12, wherein the heating step is carried out using a rotating drum dryer.

19. The method of claim 12, wherein the step of removing water from the nitrogen-rich liquid comprises concentrating the nitrogen-rich liquid to a total nitrogen concentration of about 4% to about 16% by weight.

20. The method of claim 12, wherein the moisture content of the manure is decreased during the heating step from above 25% to below 10% by weight.

* * * * *